(12) United States Patent
Grizim et al.

(10) Patent No.: US 9,317,491 B2
(45) Date of Patent: Apr. 19, 2016

(54) METHODS AND SYSTEMS OF GENERATING AND EDITING ADAPTABLE AND INTERACTIVE NETWORK DOCUMENTS

(75) Inventors: Shmulik Grizim, Tel-Aviv (IL); Tzvika Steinmetz, Tel-Aviv (IL)

(73) Assignee: Webydo Systems Ltd., Tel-Aviv (IL)

( * ) Notice: Subject to any disclaimer, the term of this patent is extended or adjusted under 35 U.S.C. 154(b) by 134 days.

(21) Appl. No.: 13/301,935

(22) Filed: Nov. 22, 2011

(65) Prior Publication Data

US 2012/0131442 A1 May 24, 2012

Related U.S. Application Data

(60) Provisional application No. 61/415,882, filed on Nov. 22, 2010.

(51) Int. Cl.
*G06F 17/00* (2006.01)
*G06F 17/24* (2006.01)
*G06F 17/21* (2006.01)

(52) U.S. Cl.
CPC ............. *G06F 17/24* (2013.01); *G06F 17/211* (2013.01)

(58) Field of Classification Search
CPC .................. G06F 17/211; G06F 17/24

USPC .......................................... 715/234
See application file for complete search history.

(56) References Cited

U.S. PATENT DOCUMENTS

| | | | |
|---|---|---|---|
| 2003/0184585 A1* | 10/2003 | Lin et al. ................. | 345/763 |
| 2004/0123244 A1* | 6/2004 | Campbell et al. ............. | 715/517 |
| 2004/0190035 A1* | 9/2004 | Ozawa et al. ................ | 358/1.13 |
| 2005/0223319 A1* | 10/2005 | Ohashi et al. ................ | 715/517 |
| 2008/0148144 A1* | 6/2008 | Tatsumi ...................... | 715/235 |
| 2009/0113317 A1 | 4/2009 | Summers et al. | |
| 2011/0055737 A1* | 3/2011 | Raman et al. ................ | 715/763 |

* cited by examiner

*Primary Examiner* — Laurie Ries
*Assistant Examiner* — Zaida I Marrero

(57) ABSTRACT

A method of generating an adaptable and interactive network document which comprises selecting a layout of an interactive network document having a plurality of discrete interactive elements, automatically calculating at least one relative arrangement rule defining a relation between a layout parameter of one of the plurality of discrete interactive elements and a respective layout parameter of another of the plurality of discrete interactive elements, receiving instructions to change the layout, and applying the instructions to generate a copy of the interactive network document having an adapted version of the layout wherein layout parameters of the plurality of discrete interactive elements are adapted according the instructions and comply with the at least one relative arrangement rule.

18 Claims, 10 Drawing Sheets

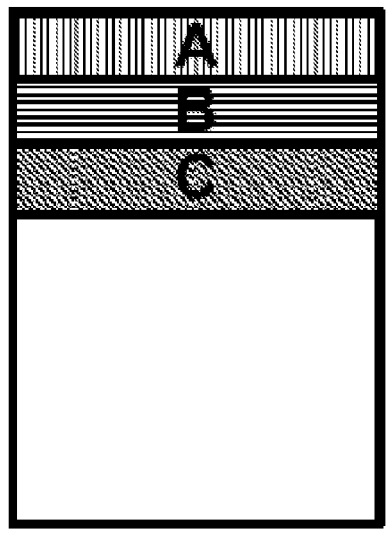
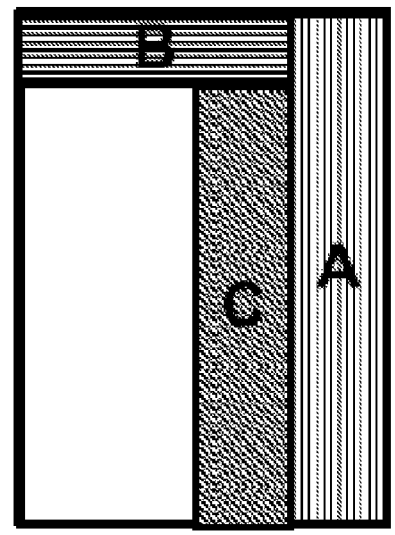
FIG. 5A  FIG. 5B
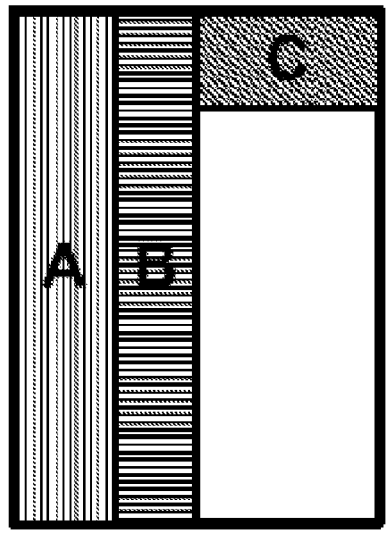
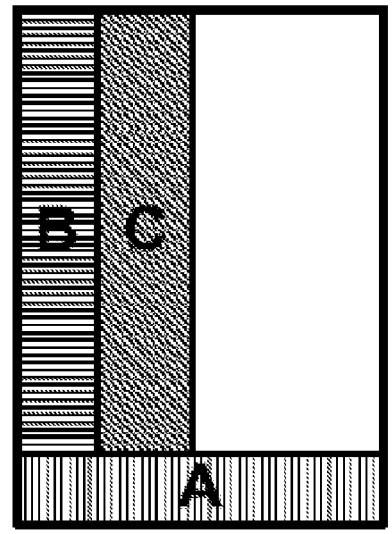
FIG. 5C  FIG. 5D

METHODS AND SYSTEMS OF GENERATING AND EDITING ADAPTABLE AND INTERACTIVE NETWORK DOCUMENTS

RELATED APPLICATION

This application claims the benefit of priority under 35 USC 119(e) of U.S. Provisional Patent Application No. 61/415,882 filed on Nov. 22, 2010, the contents of which are incorporated herein by reference in their entirety.

FIELD AND BACKGROUND OF THE INVENTION

The present invention, in some embodiments thereof, relates to methods and systems for generating network documents and, more particularly, but not exclusively, to methods and systems of generating and editing adaptable and interactive network documents.

The World Wide Web has become an important communications medium for wide-ranging purposes, from personal information gathering and exchange to commercial transactions. As personal devices such as computers, personal digital assistants (PDA's), cellular telephones, etc. are becoming increasingly integrated with this medium, individuals are becoming more reliant on the content and services offered. To take advantage of the World Wide Web, it may be necessary for businesses and individual users to design and maintain a web site that other users can visit, and which may permit the desired interaction with other users.

The procedure for designing a web site has historically taken one of two paths. The first path allows a business or individual to use a software package that assists in generating such a web site. The look and feel of the resulting web site may typically be similar to all other websites generated with the same software package because the number of choices of design or "templates" may be limited. Moreover, web sites created with software packages may have a limited level of complexity required by many businesses and individuals.

In the second path, those desiring a web site hire an outside firm to custom build its website. Typically, custom-built websites are labor intensive and, consequently, may be expensive to create and maintain. Specifically, custom-built websites typically cost from a few hundred dollars to a few hundred thousand dollars or more, and may take months to complete due to their labor-intensiveness. Additionally, custom-built websites may experience problems with usability. Also, any addition to the site, such as adding new pages or new sections requires addressing the web designer. Furthermore, such added pages may not fit within the overall scheme of the existing website, thereby resulting in an unwieldy site. Such custom-built websites may become dated in appearance or content, and may therefore require expensive changes or a new custom website altogether.

SUMMARY OF THE INVENTION

According to some embodiments of the present invention, there is provided a method of generating an adaptable and interactive network document. The method comprises selecting a layout of an interactive network document having a plurality of discrete interactive elements, automatically calculating at least one relative arrangement rule defining a relation between a layout parameter of one of the plurality of discrete interactive elements and a respective layout parameter of another of the plurality of discrete interactive elements, receiving instructions to change the layout, and applying the instructions to generate a copy of the interactive network document having an adapted version of the layout wherein layout parameters of the plurality of discrete interactive elements are adapted according the instructions and comply with the at least one relative arrangement rule.

Optionally, the at least one relative arrangement rule comprises a plurality of relative arrangement rules.

More optionally, the plurality of relative arrangement rules are ranked according to an hierarchical order; wherein the applying comprises applying the plurality of relative arrangement rules in the hierarchical order on the plurality of discrete interactive elements so that they comply with the plurality of relative arrangement rules in the adapted version.

More optionally, each of a plurality of groups of the plurality of relative arrangement rules relates to one of a plurality of clusters of the plurality of discrete interactive elements, each the cluster is located in a different of a plurality of subspaces of the interactive network document.

More optionally, the plurality of relative arrangement rules includes at least one rule defining a relation between a layout parameter of a first of the plurality of subspaces to a second of the plurality of subspaces.

Optionally, the method further comprises storing the at least one relative arrangement rule in a network accessible storage to allow performing the generating from a plurality of network nodes.

Optionally, the method further comprises publishing the copy in a storage designed to be accessed via a computer network.

Optionally, another of the plurality of discrete interactive elements is a document frame defining the display borders of the interactive network document.

Optionally, the selecting comprises receiving user instructions indicative of the layout on a webpage design platform.

Optionally, the relation is between an anchoring point of the one of the plurality of discrete interactive elements and a respective anchoring point of the another of the plurality of discrete interactive elements.

Optionally, the relation is between a border of the one of the plurality of discrete interactive elements and a border of another of the plurality of discrete interactive elements.

Optionally, the automatically calculating is performed according to the size of the plurality of discrete interactive elements in the interactive network document in relation to the size of another of the plurality of discrete interactive elements in the interactive network document.

Optionally, the automatically calculating is performed according to a location of the one of the plurality of discrete interactive elements in the interactive network document in relation to a location of the another of the plurality of discrete interactive elements in the interactive network document.

According to some embodiments of the present invention, there is provided a system of adapting a layout of an interactive network document. The system comprises a repository which stores, for an interactive network document having a layout of a plurality of discrete interactive elements, at least one relative arrangement rule defining a relation between a layout parameter of one of the plurality of discrete interactive elements and a respective layout parameter of another of the plurality of discrete interactive elements, a client module executed on a client terminal and designed to receive instructions to adapt the layout, to acquire the at least one relative arrangement rule from the repository, and to generate an adapted layout wherein layout parameters of the plurality of discrete interactive elements are automatically adapted to comply with the at least one relative arrangement rule, and a code generator which receives the adapted layout and generates accordingly a web browser compatible code.

Optionally, the code generator is stored in a first network node and the client module is stored on a second network node.

Optionally, the repository is stored in a first network node and the client module is stored on a second network node.

Optionally, the layout is generated on a first client terminal and the adapted layout is generated on a second client terminal.

According to some embodiments of the present invention, there is provided a system of generating an adaptable and interactive network document. The system comprises a plurality of client modules, executed on a plurality of client terminals, each designed to receive user instructions indicative of a layout of an interactive network document having a plurality of discrete interactive elements, a central unit which calculates at least one relative arrangement rule between a layout parameter of one of the plurality of discrete interactive elements and a respective layout parameter of another of the plurality of discrete interactive elements, and a repository which stores the at least one relative arrangement rule. The central unit is designed to receive instructions to adapt the layout and generates a copy of the interactive network document which is designed to be accessed via a computer network, wherein layout parameters of the plurality of discrete interactive elements in the copy are automatically adapted according to the instructions and comply with the at least one relative arrangement rule.

According to some embodiments of the present invention, there is provided a method of adapting a layout of an interactive network document. The method comprises providing a layout of an interactive network document having a plurality of discrete interactive elements, automatically setting a plurality of relative arrangement rules according to the layout, each the relative arrangement rule defines a relation between a layout parameter of one of the plurality of discrete interactive elements and a respective layout parameter of another of the plurality of discrete interactive elements, setting a hierarchical order of the plurality of relative arrangement rules, receiving instructions to adapt the layout, generating a copy of the interactive network document by applying the instructions and then applying the plurality of relative arrangement rules in the hierarchical order on at least some of the plurality of discrete interactive elements, and outputting the copy.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-5D are schematic illustrations of interactive network documents demonstrating exemplary implementations of relative arrangement rules according to a hierarchal order, according to some embodiments of the present invention;

DESCRIPTION OF EMBODIMENTS OF THE INVENTION

Figure 1:
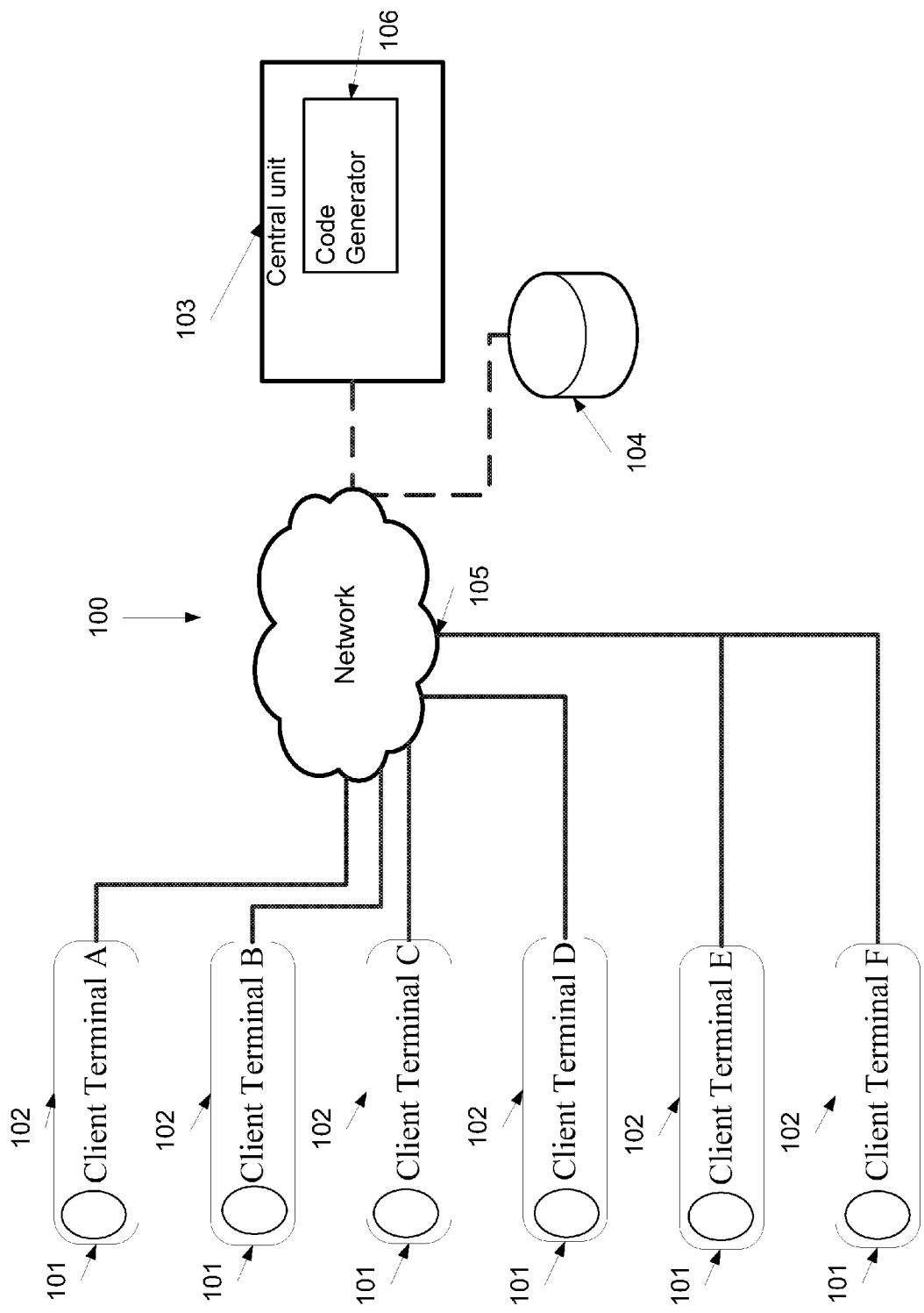
FIG. 1 is a schematic illustration of a content web generation system for generating interactive network documents having discrete content elements which maintain their relative position, size, and/or rotation when layout changes are applied, according to some embodiments of the present invention.

The present invention, in some embodiments thereof, relates to methods and systems for generating network documents and, more particularly, but not exclusively, to methods and systems of generating and editing adaptable and interactive network documents.

According to some embodiments of the present invention, there are provided methods and systems for automatically adjusting a layout of interactive network document, for example a webpage, with multiple discrete interactive elements, such as images, text frames, links and/or the like, to comply with one or more relative arrangement rules, optionally preset, after the layout is changed according to user instructions and/or automatic viewing area adaptation. Each relative arrangement rule defines a relation between a layout parameter of one of the discrete interactive elements, for example a position, a size, a shape, and/or a rotation, and a respective layout parameter of another, including for example the display frame of the network document. In such embodiments, users may apply changes to layouts without having to redesign, reposition, reshape, and/or rotate the discrete interactive elements of the adjusted interactive network document.

The relative arrangement rules allow arranging clusters of discrete interactive elements in different sub spaces. In each sub space, discrete interactive elements are arranged according to different relative arrangement rules so that layout changes in a first one sub space do not effect layout changes in a second sub space; however, the layout changes induce adaptation to relative arrangement rules in the first one sub space.

According to some embodiments of the present invention, the system includes a repository which stores, for each of a plurality of interactive network documents, one or more relative arrangement rules. The system further includes a plurality of client modules executed on client terminals. Each client module is designed to receive instructions to adapt a layout of discrete interactive elements, to acquire the respective arrangement rules from the repository, and optionally to generate an adapted layout wherein layout parameters of the plurality of discrete interactive elements are automatically adapted to comply with the relative arrangement rules. Optionally, the system includes a code generator which receives the adapted layout and generates accordingly a web browser compatible code.

According to some embodiments of the present invention, the method is based on a selected layout of an interactive network document having a plurality of discrete interactive elements, for example a certain arrangement of discrete interactive elements in a web design platform. Based on the selected discrete interactive elements, one or more relative arrangement rules are automatically calculated. When instructions to change the layout are received the instructions are applied to generate a copy of the interactive network document having an adapted version of the layout wherein layout parameters of the plurality of discrete interactive elements are adapted according the instructions and comply with the relative arrangement rule(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a content web generation system 100 for generating interactive network documents having discrete content elements which maintain their relative position, size, and/or rotation when layout changes are applied, according to some embodiments of the present invention. Optionally, an interactive network document is a web page, for example hypertext markup language (HTML) document, extensible markup language (XML) document, active server pages (ASP) document, a web site, and/or an online embeddable media file. As used herein, a discrete content element also means an image, a movie player, a text box, one or more links, a widget, a graphical symbol, and/or a graphical user interfaces (GUI). The system 100 optionally includes a plurality of client modules 101 which may be installed in or executable on a plurality of client terminals 102, network nodes, such as laptops, desktops, Smartphones, tablets and/or the like. The client module 101 are optionally design platforms, for example webpage design platforms, and/or an add-on to a design platform, which may be implemented as a software component and/or executed on a web browser. In use, the client module 101 is designed to receive, from a user, instructions indicative of a layout of an interactive network document having a plurality of discrete interactive elements.

As further elaborated below, the system 100 may be used as an infrastructure that allows content managers to adapt automatically, for example resize and reposition discrete content elements of layout of a network document in response to a layout change while maintaining a compliance with one or more relative arrangement rules. The layout change may be an adaptation of the layout of a network document to a new viewing area, an adjustment of a layout parameter, such as a position, a rotation, a size, and/or a height width ratio of one or more of the discrete content elements and/or of the frame of the network document, an addition of a new discrete content element, and a deletion of a discrete content element. Additionally or alternatively, the system 100 may be used as an infrastructure that allows providing a network document with a layout that is automatically adapted to a viewing area of a requesting entity, such as a client terminal.

The system 100 further includes a central unit 103, which is connected to a network 105, such as a packet-oriented communication network. The central unit 103 may be implemented on one or more servers. The client modules 101 are adapted to communicate with the central unit 103 via the network 105, for example the internet. In use, the communication between the client modules 101 and the central unit 103 is used for allowing the central unit 103 to store one or more relative arrangement rule(s). Each rule defines a relation between one layout parameter of one of the plurality of discrete interactive elements and a respective layout parameter of another of the plurality of discrete interactive elements and/or the document frame, for example as described below. For brevity, a discrete interactive element and/or a document frame, such as real and/or virtual borders of a webpage, may be referred to herein interchangeably. A relative arrangement rule may be mutual and/or unilateral. The relative arrangement rules, which may be set to be executed according to a hierarchical order, for example as described below, are either calculated automatically according to an analysis of a layout of the discrete interactive elements which is set in the design platform by a user and/or preset in an existing interactive network document and/or defined manually by the user. The relative arrangement rules are optionally stored in a repository 104, a database, which hosts a plurality of relative arrangement rule records. Each record includes at least a document identifier, such as a unique ID, and one or more relative arrangement rules or indications thereof.

In use, for example upon request for a network document, for example from one of the client modules 101 and/or a web browser of a network node that is connected to the network 105, the central unit 103 generates a layout adapted copy of the requested interactive network document according to the respective relative arrangement rule record. The copy is stored in a location that is designed to be accessed via the computer network 105, for example a web server.

According to some embodiments of the present invention, the central unit 103 hosts a code generator 106 which receives from the client terminals, directly or indirectly, the layout of discrete interactive elements and optionally their layout parameters. In such an embodiment, the client module may adjust the layout parameters of the discrete interactive elements to maintain compliance with the relative arrangement rules after the layout has been adjusted by the user. The code generator 106 may be adapted to generate web browser compatible code, such as hypertext markup language (HTML) code according to the layout that is sent thereto. The web browser compatible code may define the layout parameters of the discrete interactive elements in absolute terms and not in relation to one another, for example layout parameters may be fixed and/or static, according to the current layout. For example, the code generator 106 may determine the current size of each discrete interactive element in absolute parameters (e.g. pixels, millimeters, inches, and/or the like) and the position of each discrete interactive element within the document frame in absolute parameters, for example vertically with the top left corner at coordinate (X, Y) in relation to the top left corner of the environment. In such an embodiment, the code generator 106 generates web browser compatible code, such as HTML code, for the interactive network document according to the determined absolute parameters. As a result, the central unit 103 provides copies of interactive network documents which are generated in a relative manner, where layout parameters, such as position and size, of discrete interactive elements are defined in a relative manner each time a copy of the interactive network document is generated. The code generator 106 generates a code representing a given snapshot of the current layout in the client module 101 at any given time, where the layout parameters of the discrete interactive elements are defined absolutely.

In such embodiments, layouts from which codes are generated are stored. The code generator 106 may be adapted to access these stored content layouts, so that modification of the stored content may be used to generate new code and/or an update version based thereupon.

Figure 2:
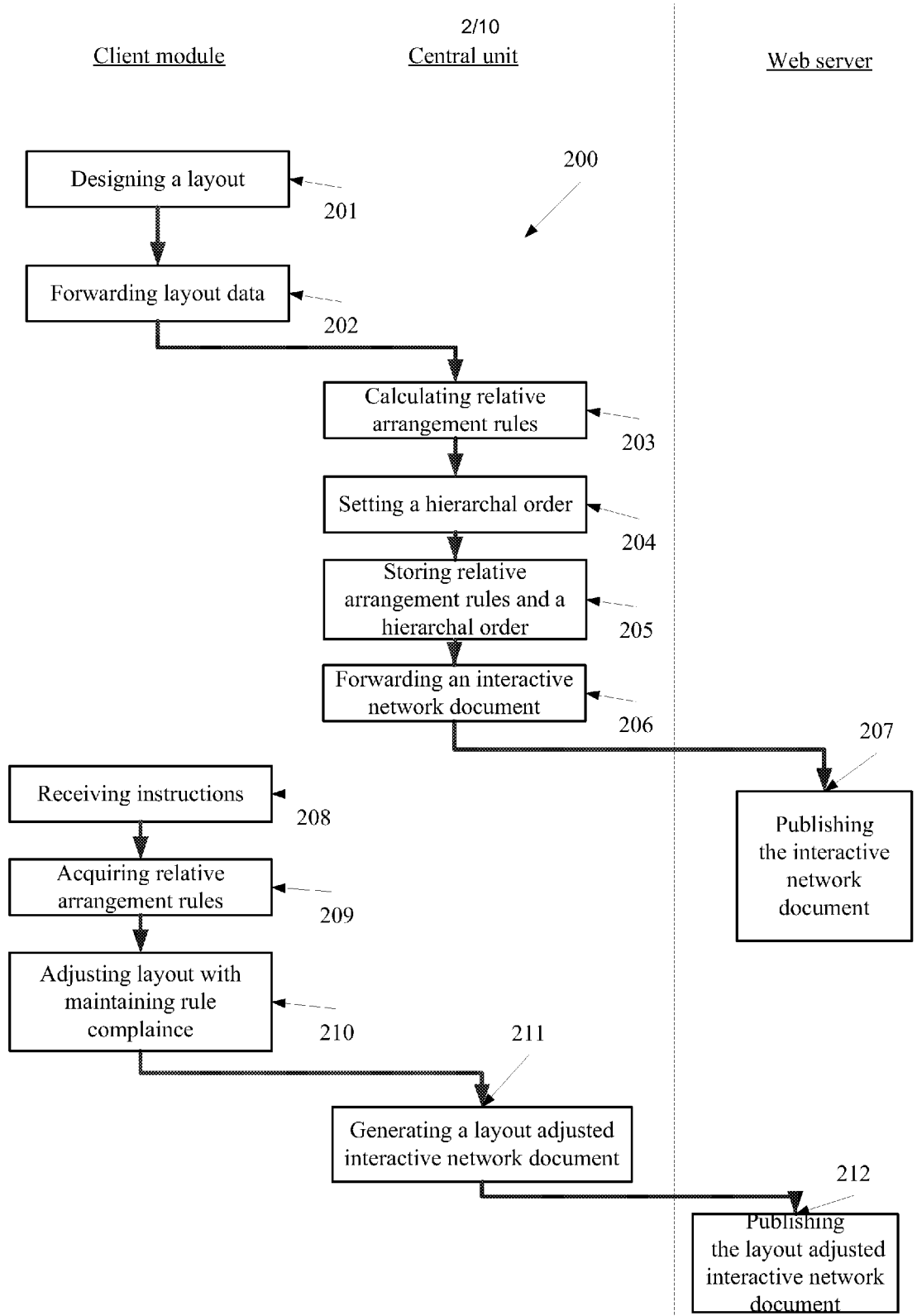
FIG. 2 is a flowchart of a process wherein the layout of discrete interactive elements in an interactive network document is generated and then adapted according to relative arrangement rules, according to some embodiments of the present invention.
Figure 3A:
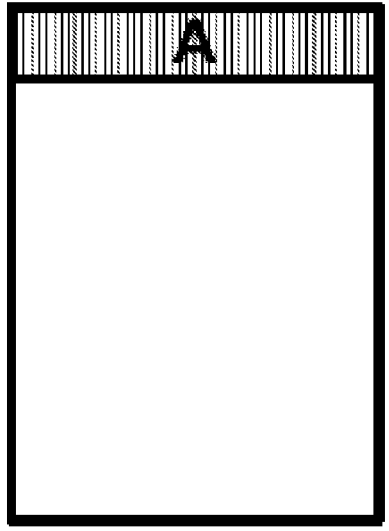
FIGS. 3A-3D are schematic illustrations depicting docking of a discrete interactive element to a document frame, according to some embodiments of the present invention.
Figure 3B:
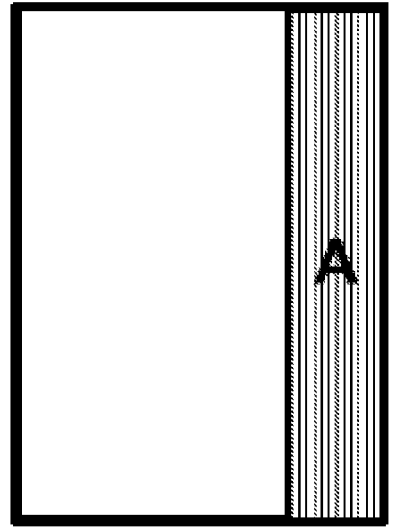
Figure 3C:
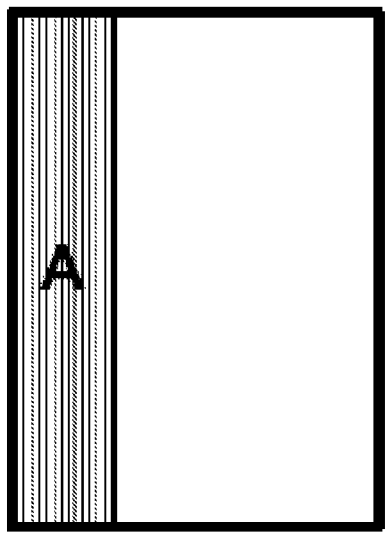
Figure 3D:
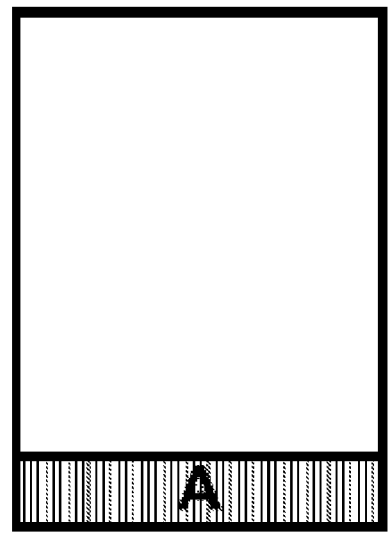
Figure 4A:
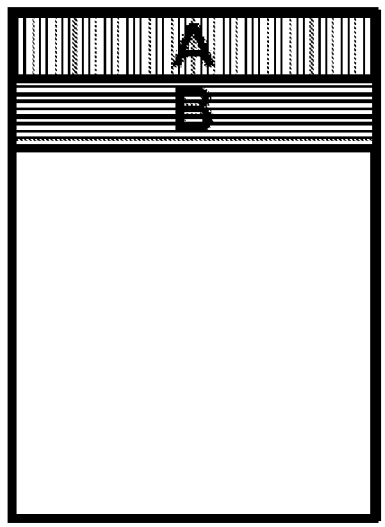
FIGS. 4A-4D are schematic illustrations depicting docking of a discrete interactive element to another discrete interactive element, according to some embodiments of the present invention.
Figure 4B:
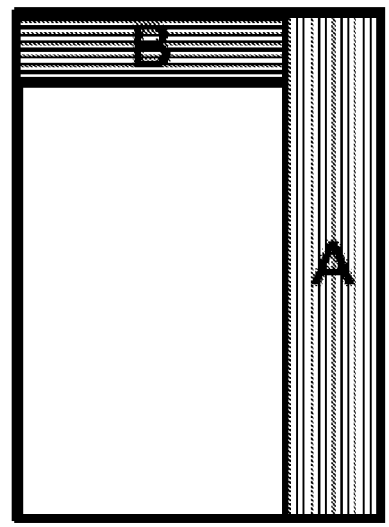
Figure 4C:
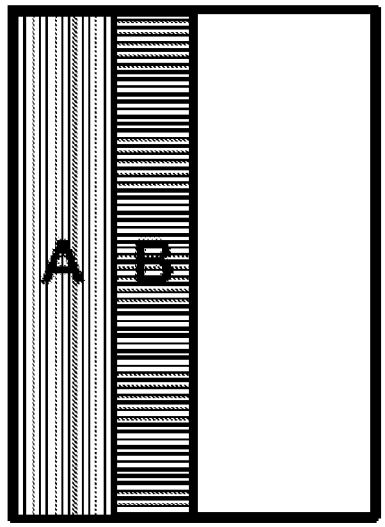
Figure 4D:
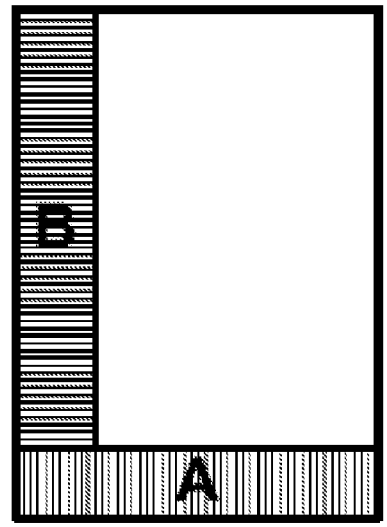

Reference is now also made to FIG. 2, which is a flowchart 200 of a process wherein the layout of discrete interactive elements in an interactive network document is adapted according to relative arrangement rules after being changed, for example in response to user instructions, according to some embodiments of the present invention. Though reference is made to a central unit 103, relative arrangement rules may be calculated or set locally on the client module.

Optionally, as shown at 201, a user designs a layout of a plurality of discrete interactive elements in an interactive network document, for example using a client module 101. The client module 101 allows the user to define and/or to modify various visual characteristics and/or parameters of the discrete interactive elements. A discrete interactive element may be in proximity to other discrete interactive element(s), encircle(s) other discrete interactive element(s) and/or overlapping other discrete interactive element(s). The client module 101 may be adapted to convert the formats of digital content into formats compatible with the system 100. The client module 101 allows the user to import, generate, delete and/or add discrete interactive elements in an environment that is indicative of a layout in an interactive network document. The user may define one or more layout parameters relating to each one of the discrete interactive elements, for example size, color, shape, rotation and/or the like, by interacting with a man machine interface (MMI) of the hosting client terminal 102.

Now, as shown at 202, layout data, for example the layout of the interactive network document and/or an indication thereof, is forwarded to the central unit 103. As shown at, 203, the central unit 103 calculates a plurality of relative arrangement rules according to the layout of the discrete interactive elements. Each relative arrangement rule defines relations between discrete interactive elements, between a discrete interactive element and a reference element, and/or between a discrete interactive element and the document frame, which is indicative of the network document borders. For example, a calculated relative arrangement rule includes a relative location and/or size of one discrete interactive element in relation to the location and/or size of another.

Additionally or alternatively, plurality of relative arrangement rules may be defined by the user, for example using a designated user interface of the client module.

Optionally, a relative arrangement rule defines which discrete interactive element should be adapted to change of another. In such an embodiment, a relative arrangement rule defines which discrete interactive element(s) are to be set as following discrete interactive elements which follow a discrete interactive element which is to be set as a followed discrete interactive element. In such embodiments, relative arrangement rule may be determined automatically based on relative location in the aforementioned layout. For example, if a user places one discrete interactive element on top of another, the discrete interactive element with the smaller area is set automatically as a discrete interactive element which follows changes of layout parameter(s) of the discrete interactive element with the larger area.

Optionally, the relative arrangement rule includes instructions to attach a border or an anchoring point, such as a pixel, of one discrete interactive element to the border or anchoring point of another. This attachment may be referred to herein as docking. For example, FIGS. 3A-3D depict the docking of a discrete interactive element [A] to the top border, the right side border, the left side border, and the bottom border of a document frame. FIGS. 4A-4D depict the docking of a discrete interactive element [A] to the top border, the right side border, the left side border, and the bottom border of a discrete interactive element [B] in the document frame. A discrete interactive element may be docketed to another discrete interactive element and/or the document frame so that it is adapted to maintain the attachment event when the discrete interactive element to which is attached changes in size, rotation, and/or shape. Optionally, the docketed discrete interactive element may change its size according to such changes. Once a discrete interactive element is docked to a certain discrete interactive element, whenever a change is made in the layout parameter of the certain discrete interactive element, either directly or indirectly, the system 100 adapts the docked discrete interactive element by calculating a new size, rotation and/or a position thereto according to the change. As used herein, an indirect change may be a change induced to a discrete interactive element in response to a change in a discrete interactive element to which it is not docketed.

Optionally, as shown at 204, a hierarchal order is automatically calculated for the applying the relative arrangement rules with regard to discrete interactive elements. For example, the following hierarchic rules are provided:

a relative arrangement rule pertaining to the document frame is applied before a relative arrangement rule pertaining to discrete interactive elements only;

a relative arrangement rule pertaining to a discrete interactive element that is contained in another discrete interactive element is applied after relative arrangement rules pertaining to the containing discrete interactive element; and a relative arrangement rule pertaining to a discrete interactive element which is placed to the left and/or to the right of a certain discrete interactive element is applied after the certain discrete interactive element.

The hierarchal order has an effect on the adjustment of the layouts.

Optionally, the hierarchal order of the relative arrangement rules is set in a graph, optionally directional, for example a tree, wherein child vertexes are executed only after all their parent vertexes are executed. Optionally, sibling vertexes have no hierarchy therebetween.

For example, reference is now made to FIGS. 5A-5D, which are schematic illustrations of interactive network documents demonstrating exemplary implementations of relative arrangement rules according to a hierarchal order. In FIG. 5A, the discrete interactive element [A] is docked to the top border of the document frame, discrete interactive element [B] is docked to the bottom border of discrete interactive element [A], and discrete interactive element [C] is docked to the bottom border of discrete interactive element [B]. In FIG. 5B discrete interactive element [A] is docked to the right border of the document frame, discrete interactive element [B] is later docked to the top border of the document frame, and discrete interactive element [C] is docked to the left border of discrete interactive element [A]. In FIG. 5C, discrete interactive element [A] is docked to the left border of the document frame, discrete interactive element [B] is docked to the right border of discrete interactive element [A], and discrete interactive element [C] is later docked to the top border of the document frame. Comparing FIG. 5C and FIG. 5B clearly indicates how the implementation of rules of hierarchy effects the placement of discrete interactive elements within the document frame as discrete interactive element [B] priority over discrete interactive element [C] is clear. In FIG. 5D discrete interactive element [A] is docked to the bottom border of the document frame, discrete interactive element [B] is docked to the left border of the document frame, and discrete interactive element [C] is docked to the right border of discrete interactive element B.

As shown at 205, the relative arrangement rules, and optionally the hierarchal order, are stored as a record that is associated with the interactive network document, for example in the repository 104 and/or at a local memory associated with the client terminal 101.

Figure 6A:
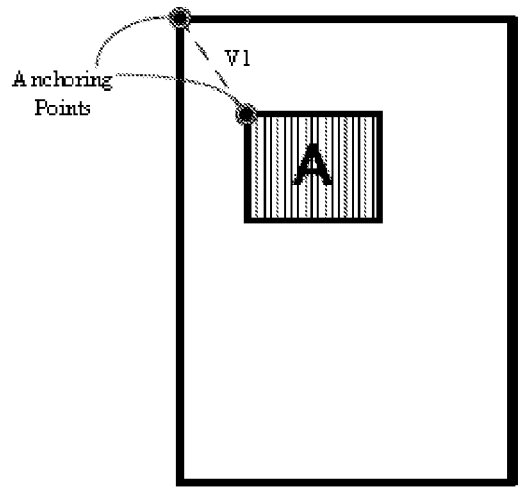
FIGS. 6A-6D are schematic illustrations of interactive network documents demonstrating exemplary implementations of relative arrangement rules defining a relation between locations of anchoring points, according to some embodiments of the present invention.
Figure 6B:
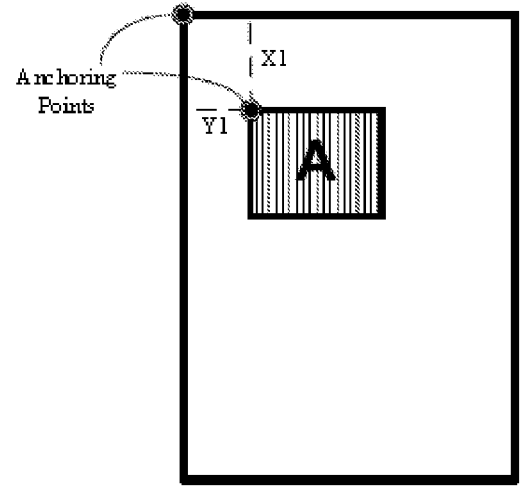
Figure 6C:
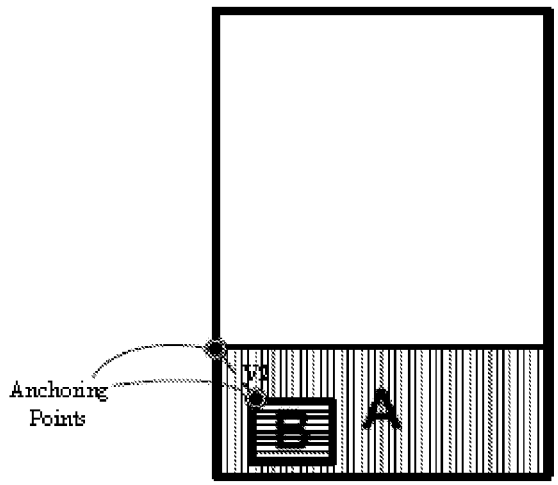
Figure 6D:
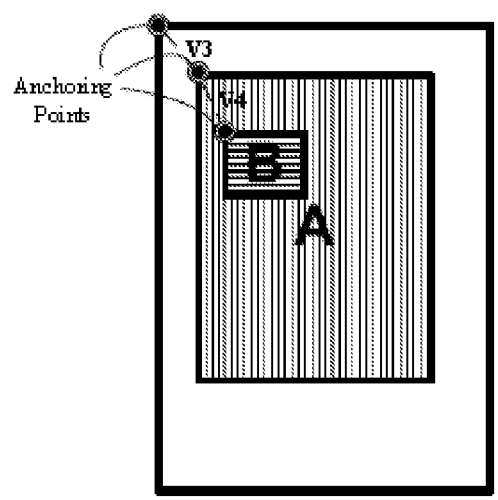

Optionally, a relative arrangement rule defines a relation between a location of an anchoring point, such as a pixel, of the docketed discrete interactive element, referred to herein as a following discrete interactive element, and a respective anchoring point of the discrete interactive element it is docketed to, referred to herein as a followed discrete interactive element. For example, the location of the following discrete interactive element within a followed discrete interactive element is based on the position of a specific anchoring point thereof, such as the top left corner, in relation to the position of a specific anchoring point of the followed discrete interactive element or in relation to a specific anchoring point of the frame, such as the top left corner. For instance, the following discrete interactive element may be defined as being positioned so that the top left corner thereof is 5 centimeters (cm) downwardly at an angle of 30° from the top left corner of the followed discrete interactive element, for example as shown at FIG. 6A. It should be noted that this is equal to defining a relative arrangement rule setting the position of the following discrete interactive element in relation to the followed discrete interactive element such that the top left corner of thereof is located at a (X, Y) coordinate of a coordinates system with the top left corner of the following discrete interactive element is the origin of the coordinates system, for example as shown at FIG. 6B. Another example is found in FIG. 6C, which depicts a discrete interactive element [A], is docked to the bottom border of a document frame and discrete interactive element [B] is defined within the boundaries discrete interactive element [A]. Distance V2 represents a position of the anchoring point of discrete interactive element [B] in relation to the anchoring point of the discrete interactive element [A]. Another example is found in FIG. 6D which depicts a discrete interactive element [A] is defined as within the boundaries of the document frame and discrete interactive element [B] is defined as within the boundaries of discrete interactive element [A]. Distance V3 represents the position of the anchoring point of discrete interactive element [A] in relation to the anchoring point of the document frame it is within, and V4 represents the position of the anchoring point of discrete interactive element [B] in relation to the anchoring point of the discrete interactive element [A].

Optionally, a relative arrangement rule defines a relation between discrete interactive elements in a certain sub space, for example the boundaries of a contained discrete interactive element. In such a manner, different sub spaces of a certain interactive network document, for example a webpage, are managed separately. In such an embodiment, one or more relative arrangement rules may be used for defining layout relations between the sub spaces.

Optionally, as shown at 206, a copy of the interactive network document, for example the webpage, is forwarded to a storage wherein it is published. In such an embodiment, the copy is sent to be stored in a web server wherein it is available to be accessed via a computer network, for example via web browsers, as shown at 207. The request to publish may be sent from a client terminal 101 and/or a web browser which requests to access the interactive network document. Optionally, the user interface of the client module 101 includes a publish document control element that triggers the forwarding of the current layout, for example a snapshot of the layout of the discrete interactive elements on the screen to the central unit 103 or instructions which are indicative thereof, for example to the code generator 106. The code generator 106 generates a web browser compatible code, such as HTML code according to the received data. Optionally, the web browser compatible code is generated automatically in real time, for example in response to a request from a web browser.

Now, as shown at 208, instructions to adapt the layout of the interactive network document are received, for example from at a client module 101 and/or optionally from any other authorized network node. The instructions are optionally to adapt one or more layout parameters of a discrete interactive element in the interactive network document, for example resizing, repositioning, adjusting the orientation, and/or the like. The instructions are optionally to delete a discrete interactive element from the interactive network document. The instructions are optionally to adapt the document frame of the interactive network document to dimensions of a viewing area. The instructions are optionally received from control elements. The user may also use the control elements to select, tune, and/or modify the aforementioned relations. For example, the control elements for the placement of discrete interactive elements may be Drag-and-Drop control elements.

According to some embodiments of the present invention, relations are defined with reference to one or more reference element(s) stored in a reference storage location such as a functionally associated data repository and/or as part of a master interactive network document. When a change is made to the reference element(s), the central unit 103 may automatically modify the layout parameters of the discrete interactive elements according to the relative arrangement rule(s). Optionally, a common reference element may be defined for adjusting a plurality of layouts of a plurality of different interactive network documents simultaneously. In such a manner, a number of interactive network documents, for example a series, optionally related, are modified at the same time according to a common reference.

Now, as shown at 210, the layout of the interactive network document is adapted according to received instructions while compliance with the one or more relative arrangement rules, which are optionally set in a hierarchical order, is maintained. The relative arrangement rules are optionally maintained by calculating adjusted sizes and/or positions for discrete interactive elements based on the relative arrangement rules in the respective record. The relative arrangement rules are either locally stored at the client module and/or acquired from the storage which stores the respective record, as shown at 209. Alternatively, the instructions are forwarded to the central unit which adapts the layout of the interactive network document accordingly while compliance with the one or more relative arrangement rules is maintained. In such an embodiment, once relative arrangement rule(s) which define relations between two or more discrete interactive elements and/or between discrete interactive elements and the borders of the interactive network document are associated with an interactive network document, the system 100 may automatically maintain the relations throughout any changes made in the layout of the interactive network document.

Figure 7A:
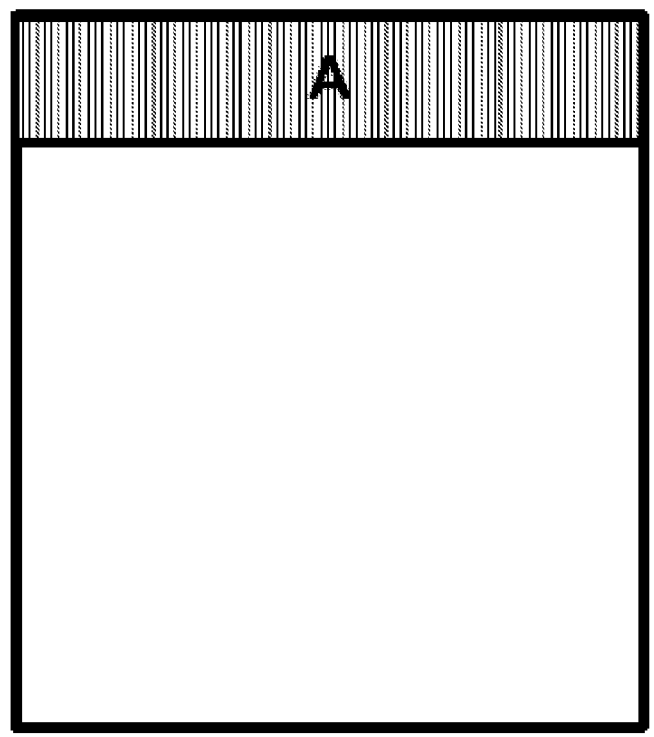
FIGS. 7A-7E are schematic illustrations of document frames demonstrating a series of exemplary insertions of discrete interactive elements into an exemplary document frame associated with a record having exemplary relative arrangement rules, according to some embodiments of the present invention.
Figure 7B:
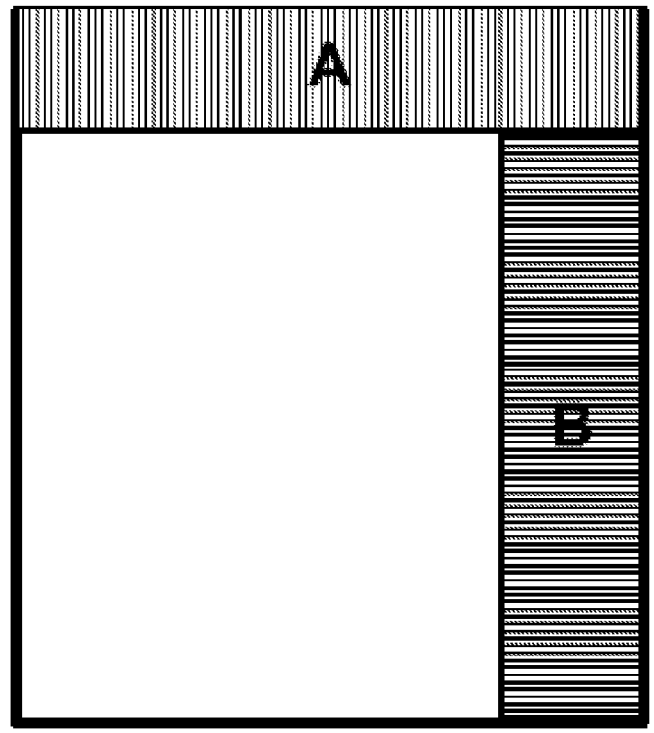
Figure 7C:
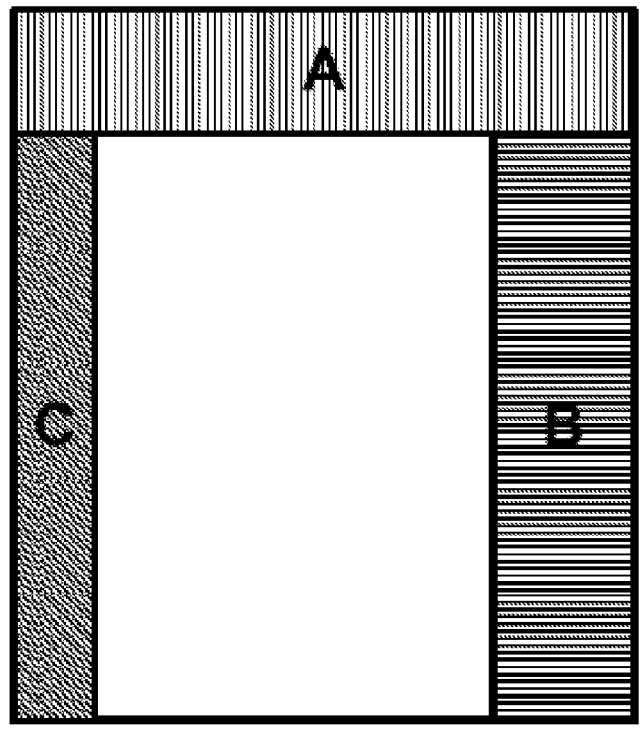
Figure 7D:
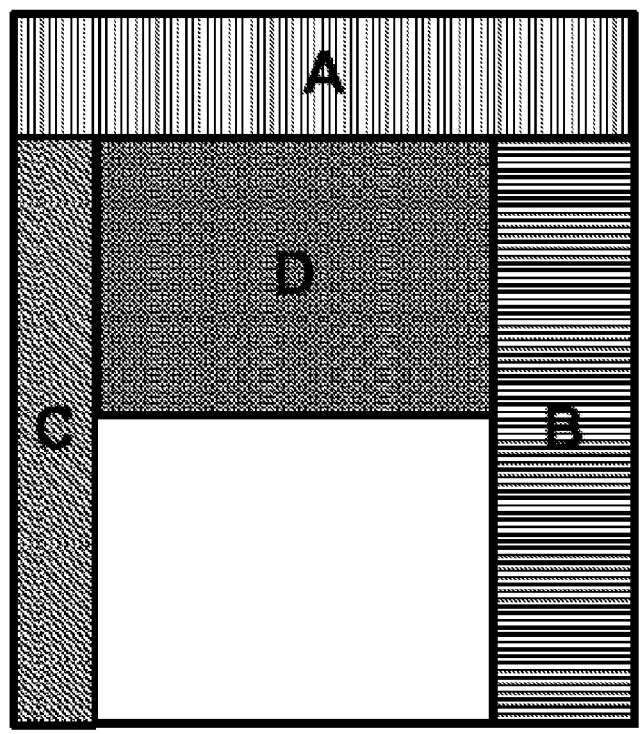
Figure 7E:
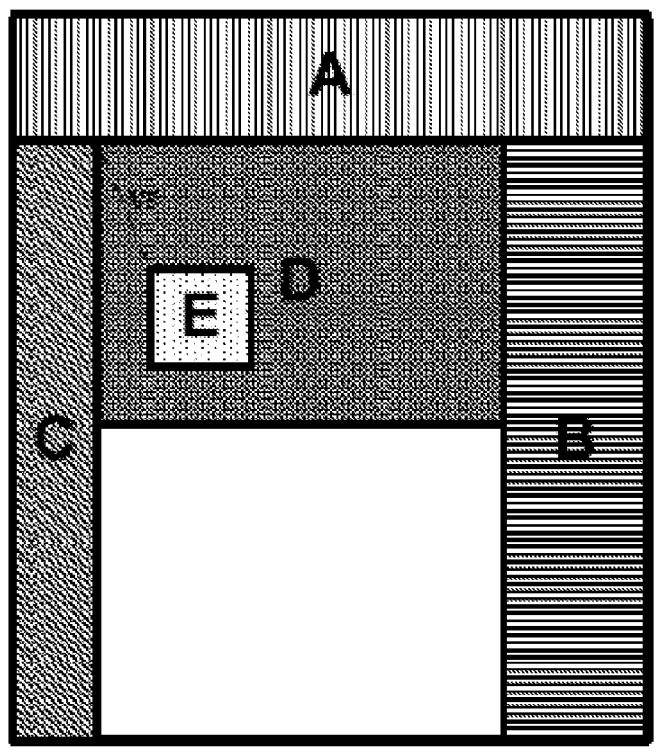
Figure 7F:
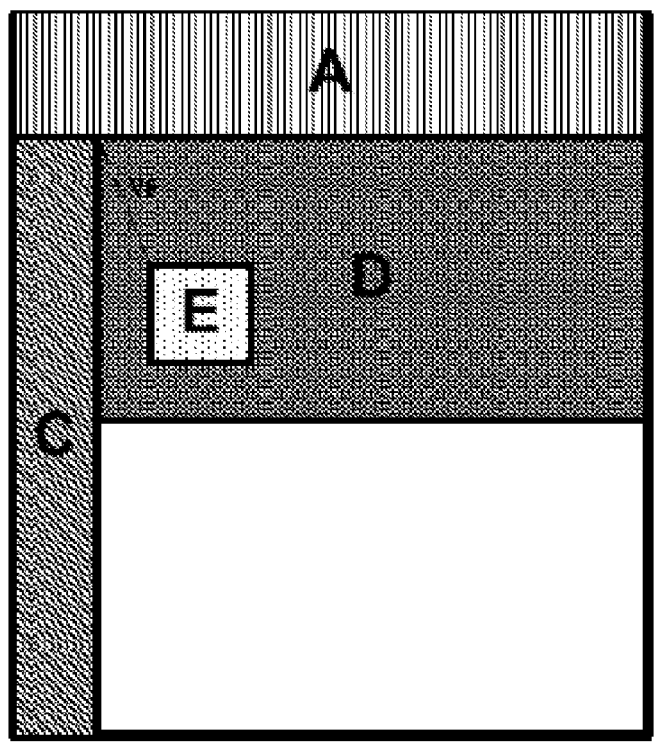
FIGS. 7F-7G are schematic illustrations of automatic resizings and repositionings of discrete interactive elements in response to the modification and deletion of a discrete interactive element from a layout, according to some embodiments of the present invention.

For example, reference is now also made to FIGS. 7A-7F are schematic illustrations of document frames demonstrating a series of exemplary insertions of discrete interactive elements into an exemplary document frame associated with a record having exemplary relative arrangement rules defined for the discrete interactive elements and to FIGS. 7F-6G which are schematic illustrations of automatic resizings and repositionings of discrete interactive elements in response to the modification and deletion of a discrete interactive element from the layout, according to some embodiments of the present invention. In FIG. 7A discrete interactive element A is inserted into the document frame and docked to the top border of the document frame. In FIG. 7B discrete interactive element B is subsequently inserted into the document frame and docked to the right border of the document frame. In FIG. 7C discrete interactive element C is subsequently inserted into the document frame and docked to the left border of the document frame. In FIG. 7D discrete interactive element D is subsequently inserted into the document frame and docked to the bottom border of discrete interactive element A. In FIG. 7E discrete interactive element E is subsequently inserted into the document frame and placed within the borders of discrete interactive element [D]. V5 represents the position of the anchoring point of discrete interactive element [E] in relation to the anchoring point of the discrete interactive element [D]. In FIG. 7F discrete interactive element [B] has subsequently been deleted and the other discrete interactive elements have been resized and repositioned according to the previously defined relative arrangement rules and the hierarchy therebetween. Note, as a result of the change in the layout discrete interactive element [D] has been enlarged to cover the portion of the bottom border of discrete interactive element [A] previously occupied by discrete interactive element B; however, it has not grown similarly downward. Moreover, discrete interactive element [E] has maintained its size and V5 has not changed in size or in direction. For example discrete interactive element [E] has maintained its position in relation to the anchoring point of discrete interactive element [D] the top left corner, regardless of the change in the dimensions of interactive element [D].

Figure 7G:
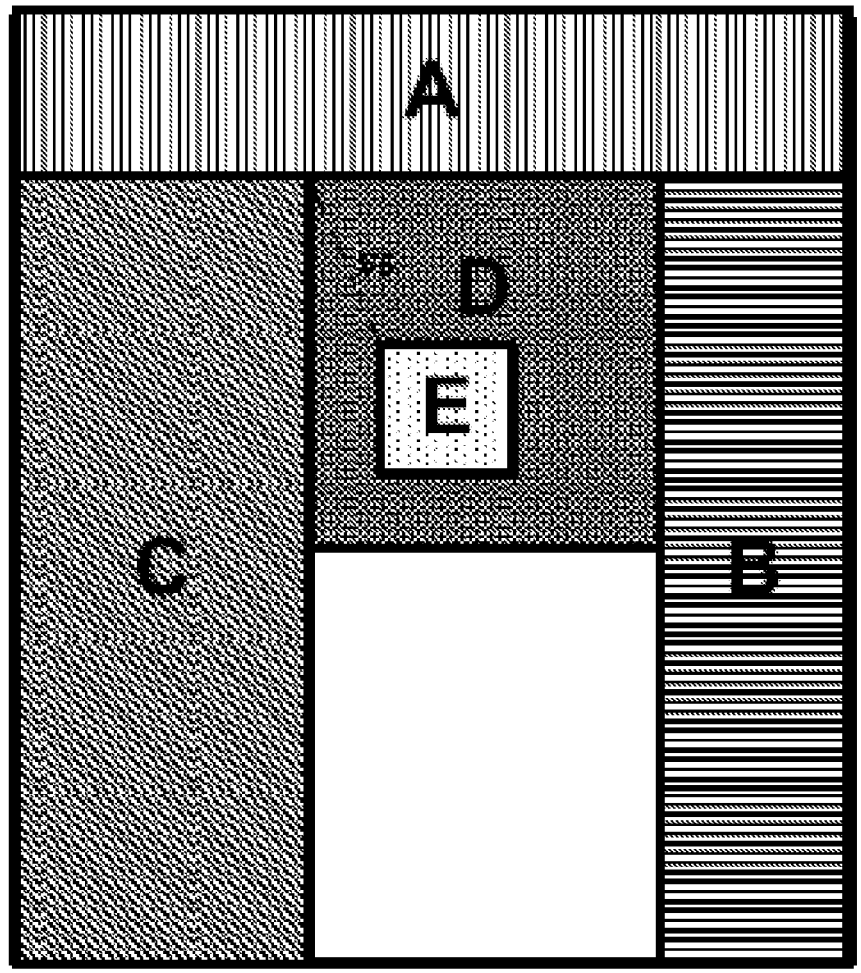

In FIG. 7G, discrete interactive element [B] has not been deleted; however, discrete interactive element [C] has been modified to be doubled in size in the horizontal direction. Again, the other discrete interactive elements have been resized and repositioned according to the previously defined relative arrangement rules and the hierarchy therebetween. Note, as a result of the change in the layout discrete interactive element [D] has shrunk in the horizontal direction to vacate the portion of the bottom border of discrete interactive element [A] which is now occupied by discrete interactive element [C]; however, it has not shrunk similarly in the vertical direction. Moreover, discrete interactive element [E] has maintained its size and V5 has not changed in size or in direction. For example, discrete interactive element [E] has maintained its position in relation to the anchoring point of discrete interactive element [D], the top left corner, regardless of the change in dimensions of discrete interactive element [D].

Optionally, as shown at 211, the central unit generates a new copy of the interactive network document and/or adjusts the previous copy according to the adjusted layout. In such an embodiment, the new copy is sent to replace the previous copy in the web server wherein it is available to be accessed via the computer network, for example via web browsers, as shown at 212.

It is expected that during the life of a patent maturing from this application many relevant systems and methods will be developed and the scope of the term computing unit, central unit, a network, and a module is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of generating an adaptable and interactive network document, comprising:
    extracting a visual layout of an interactive network document having a plurality of discrete interactive elements and published in a network accessible storage to be available to a plurality of web browsers installed on a plurality of client terminals;
    automatically calculating for said extracted visual layout, plurality of relative arrangement rules ranked according to an hierarchical order each one of said plurality of relative arrangement rules defining a relation between a layout parameter of one of said plurality of discrete interactive elements and a respective layout parameter of another of said plurality of discrete interactive elements;
    storing said plurality of relative arrangement rules in association with said interactive network document;
    receiving instructions to change said visual layout; and
    applying said instructions to change said visual layout of said interactive network document for generating accordingly a layout adjusted interactive network document having an adapted version of said visual layout wherein layout parameters of said plurality of discrete interactive elements are adapted according to said instructions such that said plurality of discrete interactive elements comply with said plurality of relative arrangement rules in said hierarchical order; and
    replacing said interactive network document with said layout adjusted interactive network document in said network accessible storage such that said layout adjusted interactive network document is available to said plurality of web browsers.

2. The method of claim 1, wherein each of a plurality of groups of said plurality of relative arrangement rules relates to one of a plurality of clusters of said plurality of discrete interactive elements, each said cluster is located in a different of a plurality of subspaces of said interactive network document.

3. The method of claim 2, wherein said plurality of relative arrangement rules includes at least one rule defining a relation between a layout parameter of a first of said plurality of subspaces to a second of said plurality of subspaces.

4. The method of claim 1, wherein said another of said plurality of discrete interactive elements is a document frame defining display borders of said interactive network document.

5. The method of claim 1, wherein said extracting comprises receiving user instructions indicative of said visual layout on a webpage design platform.

6. The method of claim 1, wherein said relation is between an anchoring point of said one of said plurality of discrete interactive elements and a respective anchoring point of said another of said plurality of discrete interactive elements.

7. The method of claim 1, wherein said relation is between a border of said one of said plurality of discrete interactive elements and a border of said another of said plurality of discrete interactive elements.

8. The method of claim 1, wherein said automatically calculating is performed according to the size of said plurality of discrete interactive elements in said interactive network document in relation to the size of said another of said plurality of discrete interactive elements in said interactive network document.

9. The method of claim 1, wherein said automatically calculating is performed according to a location of said one of said plurality of discrete interactive elements in said interactive network document in relation to a location of said another of said plurality of discrete interactive elements in said interactive network document.

10. A non-transitory computer readable medium comprising computer executable instructions adapted to perform the method of claim 1.

11. A computer system for adapting a layout of an interactive network document, comprising:
    a non-transitory memory of a having stored thereon a repository which stores, for an interactive network document stored in a network accessible storage available to a plurality of web browsers installed on a plurality of client terminals and having an extracted visual layout of a plurality of discrete interactive elements, a plurality of automatically calculated relative arrangement rules ranked according to an hierarchical order in association with said interactive network document, each one of said plurality of relative arrangement rules defining a relation between a layout parameter of one of said plurality of discrete interactive elements and a respective layout parameter of another of said plurality of discrete interactive elements;

a client module executed on a client terminal computer and designed to receive instructions to adapt said visual layout, to acquire said plurality of relative arrangement rules from said repository, to generate an adjusted interactive network document having an adapted visual layout wherein layout parameters of said plurality of discrete interactive elements are automatically adapted to comply with said plurality of relative arrangement rules in said hierarchical order; and a non-transitory memory having stored thereon a code generator which receives said adapted visual layout and generates accordingly a web browser compatible code and replaces said interactive network document with said layout adjusted interactive network document in said network accessible storage such that said layout adjusted interactive network document is available to said plurality of web browsers.

12. The system of claim 11, wherein said code generator is stored in a first network node and said client module is stored on a second network node.

13. The system of claim 11, wherein said repository is stored in a first network node and said client module is stored on a second network node.

14. The system of claim 11, wherein said layout is generated on a first client terminal and said adapted layout is generated on a second client terminal.

15. A computer system for generating an adaptable and interactive network document, comprising:

a plurality of client modules, executed on a plurality of client terminal computers, each designed to receive user instructions indicative of a visual layout of an interactive network document published in a network accessible storage to be available to a plurality of web browsers installed on a plurality of client terminals and having a plurality of discrete interactive elements;

a central computer unit which calculates for said visual layout, a plurality of relative arrangement rules ranked according to an hierarchical order, each one of said plurality of relative arrangement rules defining a relation between a layout parameter of one of said plurality of discrete interactive elements and a respective layout parameter of another of said plurality of discrete interactive elements; and a non-transitory memory having stored thereon a repository which stores said plurality of relative arrangement rules in association with said interactive network document;

wherein said central computer unit is designed to receive instructions to adapt said visual layout and generates accordingly a layout adjusted interactive network document having an adapted version of said interactive network document which is designed to be accessed via a computer network, wherein layout parameters of said plurality of discrete interactive elements in said layout adjusted interactive network document are automatically adapted according to said instructions and comply with said plurality of relative arrangement rules it said hierarchical order;

wherein said central computer unit is designed to replace said interactive network document with said layout adjusted interactive network document in said network accessible storage such that said layout adjusted interactive network document is available to said plurality of web browsers.

16. A method of adapting a visual layout of an interactive network document, comprising:

providing an extracted visual layout of an interactive network document having a plurality of discrete interactive elements and published in a network accessible storage to be available to a plurality of web browsers installed on a plurality of client terminals;

automatically setting for said extracted visual layout, a plurality of relative arrangement rules according to said visual layout, each said relative arrangement rule defines a relation between a layout parameter of one of said plurality of discrete interactive elements and a respective layout parameter of another of said plurality of discrete interactive elements;

setting a hierarchical order of said plurality of relative arrangement rules;

receiving instructions to adapt said visual layout;

generating a layout adjusted interactive network document having an adapted version of said interactive network document by applying said instructions and then applying said plurality of relative arrangement rules in said hierarchical order on at least some of said plurality of discrete interactive elements; and replacing said interactive network document with said layout adjusted interactive network document in said network accessible storage such that said layout adjusted interactive network document is available to said plurality of web browsers.

17. A non-transitory computer readable medium comprising computer executable instructions adapted to perform the method of claim 16.

18. The method of claim 1, wherein said layout parameter of said discrete interactive elements is defined in absolute terms.

* * * * *